Dec. 24, 1957    S. M. KULUSIC    2,817,253
UNIVERSAL DRILL JIG
Filed March 19, 1954

INVENTOR.
STEVE M. KULUSIC.
BY
Robert A. Sloman
ATTORNEY.

United States Patent Office 2,817,253
Patented Dec. 24, 1957

2,817,253

UNIVERSAL DRILL JIG

Steve M. Kulusic, Hazel Park, Mich.

Application March 19, 1954, Serial No. 417,445

3 Claims. (Cl. 77—62)

This invention relates to a universal drill jig, and more particularly to a drill jig adapted for use with a drill press.

It is the object of the present invention to provide a universal drill jig adapted for mounting upon a drill press column for supporting selected drill guide bushings.

It is the further object of the present invention to provide in said drill jig a rotatable turret mechanism, together with means for adjustably supporting one or more interchangable drill guide bushings.

It is the further object of the present invention to provide a guide bushing support turret which may be rotated throughout 360 degrees together with means for positively locating the drill guide bushings for a drilling operation.

It is the further object of the present invention to provide a novel drill jig whereby a series of interchangable drill guide bushings may be supported upon a rotatable turret and which bushings are adapted for rotary adjustment out of alignment with the drill axis, as desired.

Figure 1:
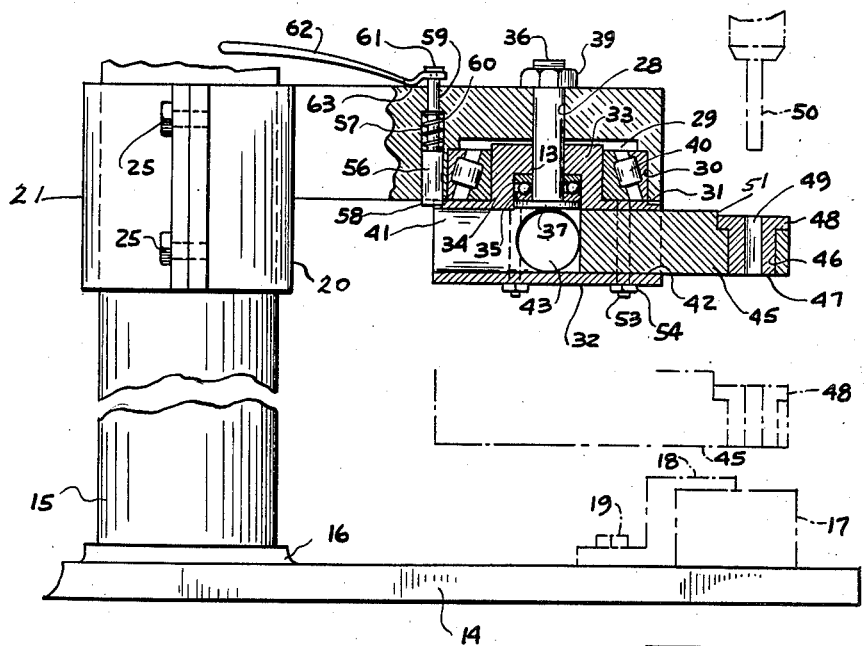
Figure 2:
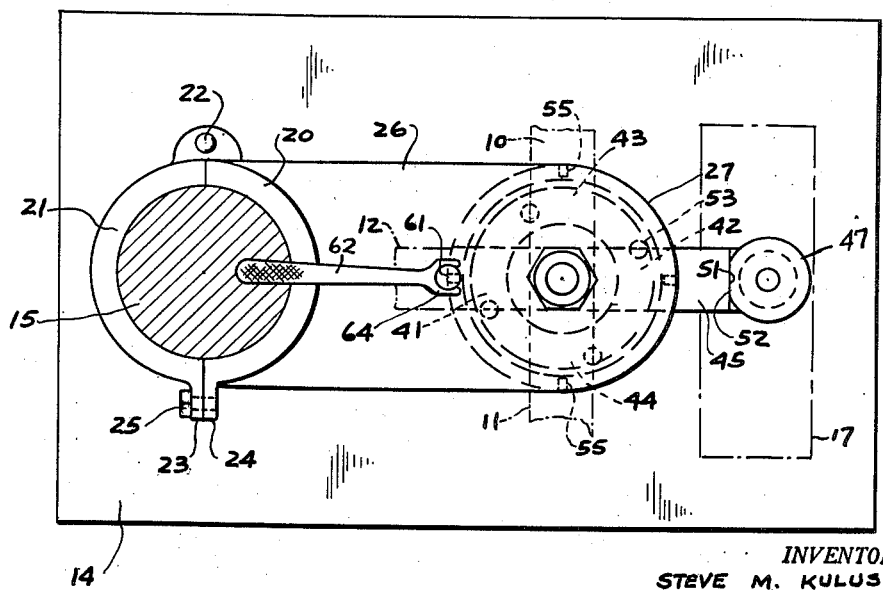

These and other objects will be seen from the following specification and claims in conjunction with the appended drawing, in which:

Fig. 1 is a partially broken away fragmentary elevational section of the present universal drill jig as mounted upon the column of a drill press; and Fig. 2 is a plan view thereof.

It will be understood that the above drawing illustrates merely a preferred embodiment of the invention and that other embodiments are contemplated within the scope of the claims hereafter set forth.

Referring to the drawing, the present universal drill jig is adapted for use upon a drill press, such as fragmentarily shown in Fig. 1, and which includes the rectangularly shaped workpiece supporting base 14 and secured thereto as at 16, the upright cylindrical column 15.

The remainder of the drill press construction is omitted from the drawing, being conventional, however there is fragmentarily shown in Fig. 1 the depending drill 50 which may be used with said drill press.

Workpiece 17 is mounted upon base 14 and retained immovably thereon by the locating clamp 18 secured to said base as at 19.

The present universal drill jig includes a split column adapter which includes the semi-cylindrical element 20 and the opposed column adapter cap 21 which cooperatively fits around column 15, and is hinged as at 22 to column adapter 20.

The opposite ends of column adapter elements 20 and 21 are in registry and are outturned as at 23 and 24 and are secured together by the cap screws 25, whereby the column adapter and arm 26 may be secured in vertically adjusted position on column 15.

Arm 26, semi-circularly shaped at its outer end as at 27, is horizontally disposed so as to overhang base 14, as shown in Fig. 1. Said arm has an upright bore 28 formed therethrough which terminates at its lower end in the undercut recess 29 of increased diameter, in turn terminating at its lower end in the undercut cylindrical recess 30. The arm has thus defined therein the annular rim 31 in its undersurface.

A horizontally disposed turret 32, preferably circular, depends from the outer end of arm 26 and has a cylindrical upright hub 33 which projects up into the undercut openings 29 and 30 of said arm and is secured thereto for rotation thereunder by the pin 36.

Cylindrical hub 33 has a central upright bore 13 which loosely receives pin 36, said bore terminating in the enlarged cylindrical bore 34. Pin 36 has a head 37 which is positioned within bore 34 of said turret hub, there being a suitable thrust bearing 35 positioned within bore 34, surrounding pin 36 and interposed between pin-head 37 and hub 33. The upper end of pin 36 projects through bore 28 of arm 26 and is immovably secured thereto by the nut 39.

Positioned within undercut opening 30 in the outer end of arm 26, there is provided a tapered roller thrust bearing 40 which surrounds hub 33 and provides an effective guide and journal for relative rotary movements of turret 32 with respect to said arm.

Formed through turret 32 are a plurality of angularly related horizontally extending bores 41, 42, 43 and 44, which in the preferred embodiment are arranged at right angles to each other.

In Fig. 1 there is shown a correspondingly shaped drill bushing bar 45 which is horizontally disposed and slidably positioned within bore 42. It is contemplated as a part of the present invention that there may be a separate bushing bar for each of said bores, such as the bushing bars 10, 11 and 12, fragmentarily illustrated in Fig. 2, corresponding to the turret bores 43, 44 and 41 respectively.

The outer ends of each of the bushing bars, as bar 45 for illustration, has an upright transverse bore 46 extending therethrough adapted to removably receive the interchangeable drill guide bushings 47, whose enlarged heads 48 rest upon an adjacent ledge formed in said bushing bar, which is vertically cut away as at 51, Fig. 2, and which thereby defines the end wall 51. It will be noted in Fig. 2 that drill guide bushing head 48 has a cut away flat portion 52 which cooperatively engages end wall 51 for retaining said drill guide bushing against rotation, said bushing having a vertical aperture of pre-determined diameter adapted to cooperatively receive the drill 50 which depends from the conventional drill head of a drill press.

There are provided within the turret 32 adjacent each of the bores 43, 44, 41 and 42 the upright openings shown in the drawing within which are adjustably positioned the elongated formed cam locks 53, portions of which are adapted to wedgingly engage the respective adjacent bushing bar, such as bushing bar 45, for securing said bushing bar in the desired longitudinally adjusted position with respect to turret 32. The said cam locks are secured in position by the nuts 54.

There is formed within the top surface of turret 32 adjacent its outer periphery a series of circularly spaced index locating slots 55 arranged in vertical alignment with the longitudinal axes of each of the bores 41, 42, 43 and 44 respectively. In the present embodiment there are shown four index locating slots 55 corresponding to the four bores 41, 42, 43 and 44; it being contemplated that should the number of bores be increased or decreased, the said slots would be correspondingly changed, however said slots would be located in vertical alignment with the longitudinal axes of the bores.

Formed within arm 26 intermediate its ends is an elongated undercut bore 57 which terminates at its upper end in a reduced bore adapted to slidably receive the stem 59 of the index pin 56, the lower end 58 thereof being so formed as to cooperatively nest within one of the index rotating slots 55, in the manner illustrated in Fig. 1.

Coiled spring 60 is positioned within bore 57 around stem 59 and interposed between the index pin body 56 and said arm normally urging said index pin downwardly.

By this construction, the turret is self-locating inasmuch as upon manual rotation of said turret, the lower end 58 of pin 56 will snap into locating slot 55 when in proper registry, under the action of spring 60.

Stem 59 extends above arm 26 and has a reduced annular portion therein below the head of the pin 61 adapted to cooperatively receive the fork 64 at one end of the cantilever or pin retractor lever 62. Said lever has a downwardly formed fulcrum 63 adjacent fork 64 adapted for supporting engagement upon the top surface of arm 26 whereby pin 56 may be manually elevated as desired to permit manual rotation of turret 32, as well as the drill bushing bar or multiple bars.

This is particularly advantageous upon the completion of all drilling operations where it is desirable that the bushing be moved out of the way temporarily to permit removal of the workpiece and insertion of another workpiece. The above-described indexing mechanism guarantees that the drill guide bushing will be returned to the same position every time.

Having described my invention, reference should now be had to the claims which follow for determining the scope thereof.

I claim:

1. A universal drill jig adapted for use on a drill press having a workpiece supporting base and an upright column; comprising a horizontally disposed arm secured at one end to said column with its opposite end overhanging said base and having a circularly undercut opening, a cylindrical turret having an upright central axis of rotation and a plurality of horizontally disposed angularly related intersecting bores therein extending through said axis of rotation, a central cylindrical hub extending upwardly from said turret loosely and rotatively projected within said undercut opening, an upright headed pin swivelled through said turret and hub at said axis and extending up through said arm and secured thereto, a drill bushing bar of constant width slidably positioned within each bore and projecting outwardly therefrom, there being an upright bore formed through the outer end of each bar, drill guide bushings of different internal bores nonrotatively and removably positioned within each upright bore, upright elongated cam locking means adjustably extending through said turret and secured thereto communicating with said horizontal bores in operative wedging engagement with said bars, there being spaced index locating slots formed in the top surface of said turret vertically aligned with the longitudinal axis of each horizontal bore, an upright index pin slidably positioned within said arm and with its lower end selectively positioned within one of said indexing slots for retaining said turret in a predetermined position of rotation, a coiled spring within said arm surrounding a portion of said pin normally urging said pin downwardly rendering said turret self locating on rotation thereof, and means pivotally mounted on said arm engaging said pin for manually disengaging said pin from an index slot.

2. The universal drill jib of claim 1, the upper end of said pin having a portion of reduced diameter above said arm, said disengaging means including an elongated cantilever having a fork at one end engaging the reduced portion of said pin, said cantilever having a formed fulcrum adjacent said forked end operatively engageable with the top surface of said arm whereby downward movement of the outer end of said cantilever disengages said pin from an index slot.

3. The drill jig of claim 1, there being an axial undercut cylindrical opening formed in said hub communicating with said bore, the head of said pin closing the lower end of said undercut cylindrical opening, a ball type thrust bearing within said cylindrical undercut opening extending around said pin, and a thrust bearing within the undercut opening in said arm cooperatively receiving said hub.

References Cited in the file of this patent

UNITED STATES PATENTS

| 190,042 | Hurd | Apr. 24, 1877 |
| 819,372 | Noyes | May 1, 1906 |
| 1,400,614 | Lovejoy | Dec. 20, 1921 |
| 1,770,721 | Willis | July 15, 1930 |
| 2,672,672 | Andreson | Mar. 23, 1954 |

FOREIGN PATENTS

| 499,101 | Germany | June 5, 1930 |